2,938,027
Patented May 24, 1960

2,938,027

PROCESS OF PREPARING ESTERS OF ACETYL TARTARIC AND CITRIC ACIDS

Martell M. Gladstone, Chicago, Ill., assignor, by mesne assignments, to Witco Chemical Company, Inc., New York, N.Y., a corporation of Delaware No Drawing. Filed Aug. 21, 1957, Ser. No. 679,515

15 Claims. (Cl. 260—234)

This invention is directed to a new and useful process of preparing diacetyl tartaric acid and acetyl citric acid esters of partial higher alkyl ethers and partial higher fatty acid esters of aliphatic polyhydric alcohols. It is particularly directed to a process for the production of diacetyl tartaric acid esters of higher fatty acid mono- and/or di-glycerides and to the corresponding acetyl citric acid esters of said higher fatty acid mono- and di-glycerides.

The aforesaid esters are known in the art, being fully disclosed and claimed in U.S. patent to F. J. Cahn and B. R. Harris, No. 2,236,516, dated April 1, 1941. Certain of them are in widespread commercial use. They are prepared, as described in said patent, by reaction, for instance, of a higher fatty acid mono- and/or di-glyceride with diacetyl tartaric acid anhydride or acetyl citric acid anhydride.

The present commercial process of producing such esters, notably, diacetyl tartaric acid esters of higher fatty acid mono- and/or di-glycerides, is effected in the general manner described in the aforesaid patent, namely, by reacting mono- and/or di-glycerides with diacetyl tartaric acid anhydride. Despite the fact that, in the practice of said process, the most satisfactory known techniques are employed, including the utilization of diacetyl tartaric acid anhydride prepared in accordance with the improvements disclosed in U.S. patent to C. F. Fuchs, No. 2,520,139, dated August 29, 1950, the finished diacetyl tartaric acid esters of the higher fatty acid mono- and/or di-glycerides not infrequently suffer from objectionable or undesirable color. Furthermore, in the process as presently commercially carried out, certain manipulative difficulties have been encountered, including occasional solidification of the diacetyl tartaric acid anhydride reaction mass in the reactor as well as in the reactor valve, with resulting concomitant difficulties.

As described in the aforesaid Patent No. 2,520,139, diacetyl tartaric acid anhydride is prepared by reacting 1 mol of tartaric acid with from about 3.1 to 3.5 mols of acetic acid anhydride, advantageously in the presence of a catalyst such as sulfuric or phosphoric acid, at temperatures of the order of about 250 degrees F. Unless the temperature is maintained above a lower limit of about 250 degrees F., solidification frequently occurs near the end of the process where essentially all of the acetic acid which was formed in the reaction has been distilled off. Furthermore, because of the necessity of employing such elevated temperatures, undesired darkening in color of the diacetyl tartaric acid anhydride is encountered and this darkening in color is carried over into the esters thereof with the mono- and/or di-glycerides. This is especially objectionable where said esters are employed in the preparation of additives for food products, which represents their essential current usage.

The aforesaid objections and difficulties are effectively overcome by the process of the present invention, hereafter described in detail. I have discovered that if tartaric acid is reacted with acetic anhydride in proportions of 1 mol of tartaric acid to from 2 to 2.9 mols of acetic anhydride, reaction mixtures are obtained which have materially lower melting points than the melting point of diacetyl tartaric acid anhydride. This enables lower reaction temperatures to be utilized in this reaction with concomitant improvement in color. Furthermore, because of the ability to use lower reaction temperatures, the risks of solidification in the reactor and reactor valve are substantially lessened. The improvement in color of the tartaric acid-acetic acid anhydride reaction mixture carries over into the esters thereof with the higher fatty acid mono- and/or di-glycerides with the result of definite improvement in the aforesaid esters and in the over-all method of manufacture thereof which represent the dominant considerations of the present invention. The improvements brought about by the present invention, therefore, make it possible to prepare esters of diacetyl tartaric acid with higher fatty acid mono- and/or di-glycerides by a significantly improved over-all procedure. With the use of 1 mol of tartaric acid to 2 to 2.3 mols of acetic anhydride, in the production of the intermediate reaction product, appreciable savings are made in the amount of acetic anhydride over the presently utilized commercial practices. From the over-all standpoint, I find it particularly advantageous to use molal ratios of 1 mol of tartaric acid to 2.3 to 2.7 mols of acetic anhydride in the production of the said intermediate reaction products.

The ratios of acetic anhydride and tartaric acid or acetic anhydride and citric acid used in the preparation of the intermediate reaction product are dependent upon whether tartaric acid or citric acid is employed. Thus, if tartaric acid is utilized, which is a dihydroxy dicarboxylic acid, for each mol thereof from 2.0 to 2.9 mols of acetic anhydride are utilized. If, on the other hand, citric acid is used, which is a monohydroxy tricarboxylic acid, for each mol thereof from 1.0 to 1.9 mols of acetic anhydride is employed. The general rule is that an upper limit of 1 mol of acetic anhydride is used for each alcohol hydroxyl group in the tartaric acid or citric acid plus an additional mol of acetic anhydride for each two carboxyl groups present in said tartaric acid or citric acid, less such an amount of said acetic anhydride as will produce a reaction mixture having a melting point at least 15, and better still at least 20 to 25, degrees F. lower than the melting point of the pure acetyl tartaric or citric acid anhydride, as the case may be. In the usual case, to achieve this end, the upper limit of acetic anhydride will be 0.1 mol less than the stoichiometric amount necessary to produce the pure acetyl anhydride of the tartaric acid or citric acid as the case may be. The lower limit of acetic anhydride is the stoichiometric quantity necessary to produce the acetyl tartaric or citric acid. In the case of acetyl tartaric acid, this lower molal ratio limit is 2 mols of acetic anhydride for each mol of tartaric acid. The limits may, therefore, be stated as follows: The lower limit, as stated above, is the stoichiometric quantity of acetic anhydride necessary to convert all of the hydroxy groups of the tartaric acid or citric acid to acetic ester linkages; and the upper limit is the total quantity of acetic anhydride necessary to esterify the hydroxy groups of the tartaric or citric acid and to convert all (namely, each two carboxyl groups; in the case of citric acid, the third carboxyl group is disregarded) of the carboxyl groups of said tartaric acid or citric acid to anhydride less an amount of said acetic anhydride so as to produce a reaction mixture having a melting point at least 15 degrees F. lower than the melting point of the corresponding pure acetyl tartaric acid anhydride or acetyl citric acid anhydride as the case may be.

The tartaric acid-acetic acid anhydride reaction products, or the citric acid-acetic acid anhydride reaction products, are reacted with derivatives which are represented by the formula $(RO)_v$—X—$(OH)_w$, where R is an alkyl or aliphatic acyl radical containing from 8 to 22 carbon atoms, X is the residue of a water-soluble aliphatic polyhydric alcohol, and $v$ and $w$ are small whole numbers, for instance, 1 or 2. Such derivatives, for example, comprise the higher alkyl partial ethers and higher fatty acid partial esters of water-soluble aliphatic polyhydric alcohols. These, too, are disclosed in the aforesaid patents. Of particular utility in the practice of the process of the present invention are the higher fatty acid partial esters of glycerol, in other words, monoglycerides and/or diglycerides, in which the higher fatty acids contain predominately from 16 to 18 carbon atoms.

The reaction products of tartaric acid or citric acid with acetic anhydride which are used in the practice of the process of the present invention are readily made. Thus, for example, 1 mol of tartaric acid is reacted with from 2 to 2.9 mols, especially 2.4 to 2.8 mols, of acetic anhydride, in the presence of a catalyst, usually an acidic catalyst, particularly sulfuric acid or phosphoric acids, at temperatures of the order of about 200 to 210 degrees F. The resulting reaction products contain varying amounts of diacetyl tartaric acid, from as little as about 4% or 5% to upwards of 95%. Even so small an amount of 4% or 5% diacetyl tartaric acid in the reaction product is sufficient to lower the melting point very substantially and is most effective in the practice of my present invention.

The reaction between (1) the reaction product of tartaric acid and acetic anhydride in the molal ratios here involved and (2) the higher fatty acid mono- and/or di-glycerides or other higher alkyl or higher fatty acid acyl derivatives of the aliphatic polyhydric alcohols is carried out either as such or in the presence of an added catalyst, especially an acidic catalyst such as sulfuric acid, but usually no additional catalyst is required.

The following examples are illustrative of the practice of the process of the present invention. Other examples will readily suggest themselves in the light of the guiding principles and teachings presented herein. The examples, therefore, are not to be taken as limitative of the proper scope of the invention.

*Example 1*

(a) One mol (150 g.) of tartaric acid is placed in a 3-neck, 1-liter flask equipped with a glass agitator and a vacuum distillation set-up for the collection of distillate. To the flask there are then added 2.4 mols (about 245 g.) of acetic anhydride and 0.03 ml. of 50% sulfuric acid and the resulting mixture is then continuously agitated until a rapid rise in the temperature of the reaction mixture begins. Agitation is then carried out intermittently whereby the temperature is controlled until it levels off at about 200 degrees F. Heat and vacuum are then applied and distillation of the acetic acid is carried out at about 250 degrees F. under a vacuum of 26 inches to produce a reaction product essentially free of acetic acid.

(b) The reaction product produced pursuant to part (a) hereof is admixed with 550 g. of a commercial tallow fatty acid monoglyceride (sold under the name "Myverol 18–30") and the resulting mixture is heated to 280 degrees F. at 26 inches of vacuum and held under said conditions until the theoretical quantity of water is collected in the distillate. The resulting diacetyl tartaric acid ester of the tallow fatty acid monoglyceride has an excellent light color and functions effectively as an addition agent in the production of shortenings and baked goods (see U.S. Patent No. 2,689,797, dated September 21, 1954).

*Example 2*

215 g. of a reaction product of 1 mol of citric acid and 1.9 mols of acetic acid anhydride (from which acetic acid which is formed in the reaction is removed by distillation in vacuo as described in part (a) of Example 1) are reacted with 560 g. of tallow fatty acid monoglyceride ("Myverol 18–30") in the manner described in part (b) of Example 1 to produce the acetyl citric acid ester of tallow fatty acid monoglyceride.

*Example 3*

The same quantity of reaction product essentially free of acetic acid, produced as described in part (a) of Example 1, is admixed with 400 g. of the stearic acid monoester of propylene glycol and reacted in the manner described in part (b) of Example 1 to produce the diacetyl tartaric acid ester of propylene glycol monostearate.

*Example 4*

The same quantity of reaction product essentially free of acetic acid, produced as described in part (a) of Example 1, is admixed with 600 g. of tallow fatty acid mixed mono- and di-esters of methyl glucoside (see U.S. Patent Nos. 2,759,922 and 2,759,923) and reacted in the manner described in part (b) of Example 1 to produce the diacetyl tartaric acid ester of the tallow fatty acid mono- and di-esters of methyl glucoside.

*Example 5*

215 g. of the reaction product of citric acid and acetic anhydride freed from acetic acid (as described in Example 2) are admixed with 600 g. of polyoxyethylene lauryl alcohol ("Brij 30") and reacted in the manner described in part (b) of Example 1 to produce the acetyl citric acid ester of the polyoxyethylene lauryl alcohol.

*Example 6*

235 g. of diacetyl tartaric acid are admixed with 1400 g. of polyoxyethylene sorbitan monooleate ("Tween 80") and reacted in the manner described in part (b) of Example 1 to produce the diacetyl tartaric acid ester of polyoxyethylene sorbitan monooleate.

*Example 7*

235 g. of diacetyl tartaric acid are admixed with 650 g. of the tallow fatty acid mono-ester of sucrose and reacted in the manner described in part (b) of Example 1 to produce the diacetyl tartaric acid ester of the tallow fatty acid mono-ester of sucrose.

What I claim as new and desire to protect by Letters Patent of the United States is:

1. A process of preparing esters of compounds having the following formula

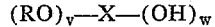

wherein R is a radical selected from the group consisting of alkyl and fatty acid acyl radicals containing from 8 to 22 carbon atoms, X is the residue of a water-soluble aliphatic polyhydric alcohol, and $v$ and $w$ are small whole numbers, which comprises providing a reaction product of an hydroxypolycarboxylic acid selected from the group consisting of tartaric acid and citric acid with acetic anhydride, said anhydride being employed in proportions within the range of (a) the stoichiometric quantity necessary to convert all of the hydroxy groups of said hydroxypolycarboxylic acid to ester groups and (b) the stoichiometric quantity necessary to convert all of the hydroxy groups of said hydroxypolycarboxylic acid to ester groups and to convert the carboxyl groups of said hydroxypolycarboxylic acid to the anhydride less an amount of said acetic anhydride so as to produce a reaction mixture which, after the removal of free acetic acid, has a melting point of at least 15 degrees lower than the melting point of the corresponding pure acetyl hydroxypolycarboxylic acid anhydride, as the case may be, and from which reaction product acetic acid has been removed, and then reacting the resulting reaction product with the aforesaid compound having the formula

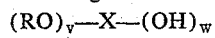

wherein R, X, $v$ and $w$ have the aforesaid meanings.

2. A process of preparing esters of compounds having the following formula $$(RO)_v-X-(OH)_w$$

wherein R is a radical selected from the group consisting of alkyl and fatty acid acyl radicals containing from 8 to 22 carbon atoms, X is the residue of a water-soluble aliphatic polyhydric alcohol, and $v$ and $w$ are small whole numbers, which comprises reacting an hydroxypolycarboxylic acid selected from the group consisting of tartaric acid and citric acid with acetic anhydride, said anhydride being employed in proportions within the range of (a) the stoichiometric quantity necessary to convert all of the hydroxy groups of said hydroxypolycarboxylic acid to ester groups and (b) the stoichiometric quantity necessary to convert all of the hydroxy groups of said hydroxypolycarboxylic acid to ester groups and to convert the carboxyl groups of said hydroxypolycarboxylic acid to the anhydride less an amount of said acetic anhydride so as to produce a reaction mixture which, after the removal of free acetic acid, has a melting point of at least 25 degrees lower than the melting point of the corresponding pure acetyl hydroxypolycarboxylic acid anhydride, as the case may be, said reaction being effected in the presence of an acid catalyst, removing acetic acid from said reaction product, and then reacting the resulting reaction product with the aforesaid compound having the formula $$(RO)_v-X-(OH)_w$$

wherein R, X, $v$ and $w$ have the aforesaid meanings.

3. A process of preparing esters which comprises providing a reaction product of an hydroxypolycarboxylic acid selected from the group consisting of tartaric acid and citric acid with acetic anhydride, said anhydride being employed in proportions within the range of (a) the stoichiometric quantity necessary to convert all of the hydroxy groups of said hydroxypolycarboxylic acid to ester groups and (b) the stoichiometric quantity necessary to convert all of the hydroxy groups of said hydroxypolycarboxylic acid to ester groups and to convert the carboxyl groups of said hydroxypolycarboxylic acid to the anhydride less an amount of said acetic anhydride so as to produce a reaction mixture which, after the removal of free acetic acid, has a melting point of at least 15 degrees lower than the melting point of the corresponding pure acetyl hydroxypolycarboxylic acid anhydride, as the case may be, and from which reaction product acetic acid has been removed, and then reacting the resulting reaction product with a member selected from the group consisting of higher fatty acid monoglycerides, diglycerides, and mixtures thereof, the higher fatty acid radicals of which contain predominately from 16 to 18 carbon atoms.

4. A process of preparing esters which comprises reacting a hydroxypolycarboxylic acid selected from the group consisting of tartaric acid and citric acid with acetic anhydride, said anhydride being employed in proportions within the range of (a) the stoichiometric quantity necessary to convert all of the hydroxy groups of said hydroxypolycarboxylic acid to ester groups and (b) the stoichiometric quantity necessary to convert all of the hydroxy groups of said hydroxypolycarboxylic acid to ester groups and to convert the carboxyl groups of said hydroxypolyboxylic acid to the anhydride less an amount of said acetic anhydride so as to produce a reaction mixture which, after the removal of free acetic acid, has a melting point of at least 25 degrees lower than the melting point of the corresponding pure acetyl hydroxypolycarboxylic acid anhydride, as the case may be, said reaction being effected in the presence of an acid catalyst, removing acetic acid from said reaction product, and then reacting the resulting reaction product with a member selected from the group consisting of higher fatty acid monoglycerides, diglycerides, and mixtures thereof, the higher fatty acid radicals of which contain predominately from 16 to 18 carbon atoms.

5. In a process of preparing diacetyl tartaric acid esters of higher fatty acid partial esters of water-soluble aliphatic polyhydric alcohols, the steps which comprise reacting 1 mol of tartaric acid with from 2 to 2.9 mols of acetic anhydride, removing acetic acid which is formed in the reaction from the reaction product, and then reacting the resulting remaining reaction product with a higher fatty acid partial ester of a water-soluble aliphatic polyhydric alcohol to produce said diacetyl tartaric acid esters of said higher fatty acid partial esters of said polyhydric alcohol, the higher fatty acid radicals of said esters containing predominately from 16 to 18 carbon atoms.

6. In a process of preparing diacetyl tartaric acid esters of higher fatty acid partial esters of water-soluble aliphatic polyhydric alcohols, the steps which comprise reacting 1 mol of tartaric acid with from 2.3 to 2.7 mols of acetic anhydride in the presence of an acid catalyst, distilling acetic acid which is formed in the reaction from the reaction product, and then reacting the resulting remaining reaction product with a higher fatty acid partial ester of a water-soluble aliphatic polyhydric alcohol to produce said diacetyl tartaric acid esters of said higher fatty acid partial esters of said polyhydric alcohol, the higher fatty acid radicals of said esters containing predominately from 16 to 18 carbon atoms.

7. In a process of preparing diacetyl tartaric acid esters, the steps which comprise reacting 1 mol of tartaric acid with from 2.4 to 2.8 mols of acetic anhydride, distilling acetic acid formed in the reaction from the reaction product, and then reacting the resulting remaining reaction product with a member selected from the group consisting of higher fatty acid monoglycerides, diglycerides, and mixtures thereof, the higher fatty acid radicals of which contain predominately from 16 to 18 carbon atoms, to produce said diacetyl tartaric acid esters.

8. In a process of preparing diacetyl tartaric acid esters, the steps which comprise reacting 1 mol of tartaric acid with from 2 to 2.9 mols of acetic anhydride in the presence of an acid catalyst at a temperature in the range of about 200 to 210 degrees F., distilling acetic acid formed in the reaction from the reaction product, and then reacting the resulting remaining reaction product with a member selected from the group consisting of higher fatty acid monoglycerides, diglycerides, and mixtures thereof, the higher fatty acid radicals of which contain predominately from 16 to 18 carbon atoms, to produce said diacetyl tartaric acid esters.

9. In a process of preparing diacetyl tartaric acid esters, the steps which comprise reacting 1 mol of tartaric acid with from 2 to 2.9 mols of acetic anhydride, removing acetic acid which is formed in the reaction from the reaction product, and then reacting the resulting remaining reaction product with a member selected from the group consisting of higher fatty acid monoglycerides, diglycerides, and mixtures thereof, the higher fatty acid radicals of which contain predominately from 16 to 18 carbon atoms, to produce said diacetyl tartaric acid esters.

10. In a process of preparing diacetyl tartaric acid esters, the steps which comprise reacting 1 mol of tartaric acid with from 2.3 to 2.7 mols of acetic anhydride in the presence of an acid catalyst, distilling acetic acid which is formed in the reaction from the reaction product, and then reacting the resulting remaining reaction product with a member selected from the group consisting of higher fatty acid monoglycerides, diglycerides, and mixtures thereof, the higher fatty acid radicals of which contain predominately from 16 to 18 carbon atoms, to produce said diacetyl tartaric acid esters.

11. In a process of preparing acetyl citric acid esters, the step which comprises providing a reaction product between 1 mol of citric acid and from 1 to 1.9 mols of acetic anhydride, from which reaction product acetic acid formed during the reaction has been essentially removed, and reacting said reaction product with a member selected from the group consisting of higher fatty acid monoglycerides, diglycerides, and mixtures thereof, the higher fatty acid radicals of which contain predominately from 16 to 18 carbon atoms, to produce said diacetyl tartaric acid esters.

12. A process of preparing acetyl citric acid esters, the step which comprises reacting 1 mol of citric acid with from 1 to 1.9 mols of acetic anhydride, in the presence of an acidic catalyst, distilling acetic acid which is formed in the reaction from the reaction product, and then reacting the resulting remaining reaction product with a member selected from the group consisting of higher fatty acid monoglycerides, diglycerides, and mixtures thereof, the higher fatty acid radicals of which contain predominately from 16 to 18 carbon atoms, to produce said diacetyl tartaric acid esters.

13. In a process of preparing diacetyl tartaric acid esters of higher fatty acid mono-esters of propylene glycol, the steps which comprise reacting 1 mol of tartaric acid with from 2 to 2.9 mols of acetic anhydride in the presence of an acid catalyst, distilling acetic acid formed in the reaction from the reaction product, and then reacting the resulting remaining reaction product with a higher fatty acid mono-ester of propylene glycol to produce said diacetyl tartaric acid esters of higher fatty acid mono-esters of propylene glycol, the higher fatty acid radicals of said ester containing predominately from 16 to 18 carbon atoms.

14. In a process of preparing diacetyl tartaric acid esters of higher fatty acid partial esters of methyl glucosides, the steps which comprise reacting 1 mol of tartaric acid with from 2 to 2.9 mols of acetic anhydride, removing acetic acid which is formed in the reaction from the reaction product, and then reacting the resulting remaining reaction product with a higher fatty acid partial ester of a methyl glucoside to produce said diacetyl tartaric acid ester of said higher fatty acid partial esters of methyl glucoside, the higher fatty acid radicals of said ester containing predominately from 16 to 18 carbon atoms.

15. In a process of preparing diacetyl tartaric acid esters of higher fatty acid partial esters of sucrose, in which the higher fatty acid radical contains predominately from 16 to 18 carbon atoms, the step which comprises providing a reaction product between 1 mol of tartaric acid and from 2 to 2.9 mols of acetic anhydride, from which reaction product acetic acid formed during said reaction has been essentially removed, and reacting said reaction product with a higher fatty acid partial ester of sucrose.

References Cited in the file of this patent

UNITED STATES PATENTS

| | | |
|---|---|---|
| 2,151,185 | Carruthers | Mar. 21, 1939 |
| 2,236,516 | Cahn et al. | Apr. 1, 1941 |
| 2,236,517 | Cahn et al. | Apr. 1, 1941 |
| 2,520,139 | Fuchs | Aug. 29, 1950 |
| 2,689,797 | Joffe | Sept. 21, 1954 |